United States Patent [19]

Austin et al.

[11] Patent Number: 5,648,444

[45] Date of Patent: Jul. 15, 1997

[54] HYDROSILATION IN ESTERS WITHOUT HYDROXYL MOIETIES

[75] Inventors: Paul E. Austin, Williamstown, W. Va.; Kenrick M. Lewis, Rego Park, N.Y.; William E. Crane, Sistersville; Rudolph A. Cameron, Vienna, both of W. Va.

[73] Assignee: Witco Corporation, Greenwich, Conn.

[21] Appl. No.: 559,341

[22] Filed: Nov. 15, 1995

[51] Int. Cl.$^6$ ............................................. C08G 77/06

[52] U.S. Cl. ............................................. 528/15; 528/25

[58] Field of Search ................................. 528/15

[56] References Cited

U.S. PATENT DOCUMENTS 5,153,293  10/1992  Hales et al. ..................... 528/15

*Primary Examiner*—Morton Foelak
*Attorney, Agent, or Firm*—Scully, Scott, Murphy & Presser

[57] ABSTRACT

The present invention encompasses manufacturing polysiloxane polyether copolymers using esters without any hydroxyl groups thereon, organohydrogen silanes and unsaturated polyoxyalkylene polyethers. Said esters are of low volatility and high boiling point and have at least eight carbons. The process yields clear copolymer solutions and do not need to have the ester solvent stripped. Also taught are novel compositions incorporating the ester solvent to make the copolymer and the copolymer and the ester solvent.

15 Claims, No Drawings

HYDROSILATION IN ESTERS WITHOUT HYDROXYL MOIETIES

BACKGROUND OF THE INVENTION

The preparation of siloxane-oxyalkylene copolymers ("Copolymers") by the hydrosilation reaction of an organohydrogensiloxane and an unsaturated polyoxyalkylene is well known. The hydrosilation reaction is typically performed in a low molecular weight, highly volatile, hydrocarbon solvent such as benzene, toluene or xylene to compatibilize the reactants and aid in the transfer and filtration of the Copolymer, or to moderate the exothermicity of the hydrosilation. Less typically, the hydrosilation reaction may be conducted without a solvent or conducted in an oxygen containing solvent such as an ether, a polyether, or a lower or higher molecular weight alcohol.

In the majority of the aforementioned processes, the hydrocarbon solvent is removed after the hydrosilation reaction is completed, since in most cases, the solvent is too flammable, toxic or otherwise detrimental to the final product or further processing steps in which the copolymer is utilized. For example, with mono-alcohols in polyurethane foam applications, the hydroxy functionalities will enter into the urethane reaction and act as reaction chain terminators in a detrimental fashion. Removal of said solvents increases batch cycle times and necessitates disposal of the solvent in an environmentally safe manner such as incineration. Moreover, there are foaming problems in removing many solvents and rarely can one get all of the solvent out of solution.

A few instances have been reported in the literature where for one reason or another it was neither necessary nor desirable to separate the copolymer from the reaction solvent. For example, U.S. Pat. No. 4,520,160 discloses the use of saturated higher alcohols, such as isostearyl alcohol, as a reaction solvent which purposely need not be removed from the resulting Copolymer when it is used subsequently in personal care compositions as emulsifiers. U.S. Pat. Nos. 4,857,583 and 5,153,293 also teach that higher boiling point polyols or monocarboxylate esters of an alkanediol purposely need not be removed from the resulting Copolymer when it is used subsequently in polyurethane foam formulations. However, the hydroxy functionality of the solvents may compete with the unsaturated polyoxyalkylene for SiH sites on the siloxane backbone, as well as the above mentioned reaction with the isocyanate in polyurethane foam. It is therefore an object of the present invention to provide an improved process for the preparation of Copolymers using superior solvents.

SUMMARY OF THE INVENTION

The present invention is directed to an improved process for the preparation of Copolymers and the Copolymer compositions obtained therefrom. These Copolymers are prepared by a hydrosilation reaction between an organohydrogenpolysiloxane and unsaturated polyoxyalkylene polyethers, in the presence of an ester containing no hydroxyl groups and, optionally, in the presence of specific additives. The esters not only aid in the preparation of the Copolymer, but if left in the Copolymer, also aid in its subsequent handling and serves as a beneficial component of a composition containing the Copolymer. Benefits include the reduction in viscosity and pour point for easy transfer of the Copolymer, improved polyol solubility and foam flowability when the copolymer is used to stabilize polyurethane and polyisocyanurate foams, production of clear compositions and reduction of window fogging when the copolymer is used to make interior automotive foams.

DETAILED DESCRIPTION OF THE INVENTION

The process for making a polysiloxane polyether modified polysiloxane of the present invention includes reacting (a) organohydrogensiloxanes; (b) unsaturated polyoxyalkylene polyethers; and (c) an ester solvent without hydroxyl moieties, in the presence of a noble metal hydrosilation catalyst in an inert atmosphere and at a temperature which does not exceed the temperature at which the organohydrogensiloxane reacts with the solvent. The present invention also includes the intermediate product of components (a)–(c) and the resulting Copolymer composition in the solvent.

ORGANOHYDROSILOXANES

The organohydrogensiloxanes employed in the present invention are those represented by the general chemical formula:

$$R_a H_b SiO_{(4-a-b)/2}$$

wherein R denotes a monovalent hydrocarbon radical free of aliphatic unsaturation, a has a value of from 1 to 3.0, b has a value of from 0 to 1 and the sum of a+b has a value of from 1.0 to 3.0. The organohydrogensiloxane can contain any combination of siloxane units selected from the group consisting of $R_3SiO_{1/2}$, $R_2HSiO_{1/2}$, $R_2SiO_{2/2}$, $RHSiO_{2/2}$, $RH_2SiO_{1/2}$, $RSiO_{3/2}$, $HSiO_{3/2}$ and $SiO_{4/2}$ provided of course, that the organohydrogenpolysiloxane contains sufficient R-containing siloxane units to provide from about 1 to about 3.0 R radicals per silicon atom and sufficient H-containing siloxane units to provide from 0.01 to 1 silicon-bonded hydrogen atoms per silicon and a total of R radicals and silicon-bonded hydrogen atoms of from 1.5 to 3.0 per silicon. The selection of the siloxane groups will, as is clear to one of ordinary skill in the art, determine the structure of the resulting Copolymer, so that one can have linear, Q (i.e., crossed) and T structures of siloxanes. The R groups represent substituted or unsubstituted monovalent hydrocarbon radicals of from 1 to 12 carbon atoms. Illustrative of suitable R radicals are alkyl radicals (such as methyl, ethyl, propyl, butyl, decyl), cycloaliphatic radicals (such as cyclohexyl and cyclooctyl), aryl radicals (such as phenyl, tolyl, and xylyl), and substituted hydrocarbon groups (such as heptafluoropropyl). R is preferably methyl. Such siloxane fluids typically are prepared as is known in the art or may be obtained commercially.

Polyethers

The unsaturated polyoxyalkylene polyethers are of the formula:

$$R^1(OCH_2CH_2)_x(OCH_2CHR^3)_wOR^2, \text{ or}$$

$$R^2O(CH[R^3]CH_2O)_w(CH_2CH_2O)_z—CR^4_2—C\equiv C—CR^4_2—(OCH_2CH_2)_z(OCH_2[R^3]CH)_wR^2$$

wherein $R^1$ denotes an unsaturated organic group containing from 3 to 10 carbon atoms such as allyl, methallyl, propargyl or 3-pentynyl. When the unsaturation is olefinic, it is desirably terminal to facilitate complete hydrosilation. $R^2$ is selected from the group consisting of hydrogen, alkyl groups containing one to eight carbon atoms, alkylene groups containing from 3 to 10 carbon atoms, acyl groups containing 2 to 8 carbon atoms or a trialkylsilyl group. Preferably $R^2$ is hydrogen, methyl, n-butyl or t-butyl group, allyl, methallyl or acetyl group. $R^3$ and $R^4$ are monovalent hydrocarbon groups such as the $C_1$–$C_{20}$ alkyl groups (for example, methyl, ethyl, isopropyl, 2-ethylhexyl, cyclohexyl and stearyl), or aryl groups (for example, phenyl and naphthyl), or alkaryl groups (for example, benzyl, phenethyl and nonylphenyl). $R^4$ may also be hydrogen. Methyl is the most preferred $R^3$ and $R^4$ group. Z has a value of 0 to 100 and w has a value of 0 to 120. Preferred values of z and w are 1 to 50 inclusive. The unsaturated polyether, whether comprised of alkyne groups or terminal olefinic groups, may be a blocked or randomly distributed copolymer of oxyalkylenes.

The amount of polyether used in the hydrosilation depends on the amount of active hydrogen in the siloxane (i.e., SiH groups). The stoichiometric ratio of unsaturated groups in the polyether to SiH groups should be from 1:1 to 1.5:1. If an $[AB]_n$ structure Copolymer (i.e., alternating polyether A./siloxane, B. blocks) is desired, then the maximum ratio should be about 1.2:1.

Ester Solvents

The present invention utilizes liquid, high boiling point carboxylate esters as the hydrosilation reaction solvents. The esters have no hydroxyl group which can interfere with the hydrosilation reaction. The esters of this invention have the general formula

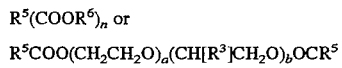

$R^5COO(CH_2CH_2O)_a(CH[R^3]CH_2O)_bOCR^5$ in which $R^3$ is as defined for the polyethers, a and b are 0 to 120, preferably 0 to 50. $R^5$ is a straight or branched alkyl, aryl, alkaryl or cycloaliphatic group of valency equal to the number, n, of ester functional groups. $R^6$ is a monovalent hydrocarbon radical derived from an alcohol. The total number of carbon atoms in $R^5$ and $R^6$ should be at least eight and preferably, at least ten. $R^5$ and $R^6$ may also include ether linkages, sulfur linkages and amine groups, provided that these functionalities do not impede the hydrosilation reaction. $R^5$ and R6 may also include sterically hindered or internally unsaturated hydrocarbon groups that do not interfere with the hydrosilation reaction. Examples of $R^5$ include $C_8H_{17}$, $C_{14}H_{29}$, $C_{16}H_{33}$, cyclohexanediyl, butoxyethyl, adipyl, azelayl, sebacyl, oleyl, phenyl, phthalyl and cinnamyl. Examples of $R^6$ are methyl, isopropyl, neopentyl, octyl, dodecyl, cyclohexyl, benzyl and stearyl.

The esters should have boiling points of greater than 170° C. at atmospheric pressure, and preferably greater than 200° C. The ester solvent(s) are inert under the hydrosilation reaction conditions and are essentially non-toxic (non-hazardous). Examples of preferred esters are isopropyl palmitate (IPP), butyl myristate (BYM), or isopropyl myristate(IPM), diethylene glycol dibenzoate, dipropylene glycol dibenzoate, polypropylene glycol dibenzoate. Naturally occurring esters that do not contain hydroxyl groups are also prefered. Moreover, esters derived from naturally occuring fatty acids or fatty alcohols, or a mixture thereof are also contemplated as useful herein.

The ester must also be free of impurities which can poison the hydrosilation catalyst, or impair the performance of the Copolymer in its applications. The ester not only aids in the preparation of the Copolymer, but when left in the Copolymer, also aids in its subsequent handling and serves as a necessary and beneficial component of compositions containing the Copolymer. In general, from 5 to about 60 weight percent, and more preferably from about 20 to 50 weight percent, of the carboxylate ester has been found to give good results.

Optional Additives

The hydrosilation reaction, can be conducted in the presence of optional additives such as the carboxylic acids salts disclosed in U.S. Pat. No. 4,847,398, or the sterically hindered nitrogen compounds of U.S. Pat. No. 5,191,103 or the phosphate salts of U.S. Pat. No. 5,159,096, which patents are incorporated herein by reference. Depending on the method of manufacture of the reactants and solvents, one or more of these additives may be present when using polar solvents for the hydrosilation of unsaturated polyethers with organohydrogensiloxanes. For example, a low, but sometimes adequate level of carboxylic acid salts or phosphate salts may already be present in olefinically substituted polyoxyalkylenes due to inadvertent exposure to traces of oxygen during subsequent capping of hydroxyl groups with allylic, methallylic, methyl or acyl groups. In such instances, the intentional use of the salt or other additive may not be necessary. Other standard additives as are known in the art may also be used.

Hydrosilation Catalyst

The hydrosilation reaction is facilitated by using catalytic amounts of a noble metal-containing catalyst. Such catalysts are well known and include platinum, palladium and rhodium-containing catalysts. They are reviewed in the compendium by, Comprehensive Handbook on Hydrosilylation, edited by B. Marciniec, relevant portions of which are incorporated herein by reference. Chloroplatinic acid and the platinum complexes of 1,3-divinyltetramethyldisiloxane are particularly preferred.

The catalyst is employed in an effective amount sufficient to initiate, sustain and complete the hydrosilation reaction. The amount of catalyst is usually within the range of from about 1 to about 100 parts per million (ppm) of noble metal, based on the total pans of the mixture of reactants and solvent. Catalyst concentrations of 5–50 ppm are preferred.

Copolymers

The resulting Copolymers may be linear siloxanes with pendant polyethers (comb) structure, T structure, Q structure or $[AB]_n$ Copolymers. The resulting structure depends on the selection of starting siloxanes and polyethers and it is clear to one of ordinary skill in the art how to choose starting materials to achieve specific structures.

Hydrosilation Reaction

Hydrosilation reactions are well known in the art, see for example Marciniec, loc. cit. The process of the present invention includes (1) forming a mixture of: (a) organohydrogensiloxanes; (b) unsaturated polyoxyalkylene polyethers; (c) an ester solvent, and (d) optionally, an additive, (2) maintaining the mixture in an inert atmosphere to a temperature which does not exceed the temperature at which the organohydrogensiloxane reacts with the solvent, (3) adding to the mixture, a catalytic amount of a noble metal hydrosilation catalyst, prior to or after heating; (4) maintaining the temperature of said mixture below about 125° C., to control the allyl to propenyl isomerization and allowing the reaction to proceed so less than 0.1 cc $H_2$ free SiH per gram of reaction mixture is left in the composition. Optionally, one may also recover the Copolymer in admixture with residual high boiling point ester solvent. The recovery may be accomplished by any number of methods, including distillation, solvent extraction, supercritical chromatography, column chromatography, but is not necessary. The reaction temperatures range from 70° to 120° C. The reaction pressure is generally atmospheric pressure, but it may be varied as necessary.

Uses

The Copolymers and Copolymer/solvent compositions prepared by the process of the present invention are particularly useful as, and have been found to be excellent and efficient surfactants for, the preparation of closed and open celled rigid foams, froth, automotive interior foam, and flexible polyether polyurethane foams. The Copolymers may provide rigid and automotive interior polyurethane foams with greater than 90% open cells. It has been found that the Copolymers of this invention provide improved levels of performance to polyurethane and polyisocyanurate foams with the solvent in situ and avoid the necessity of solvent removal from the reaction mixture in which the Copolymer was prepared. Copolymers prepared with 30 weight percent isopropyl myristate (IPM) have improved flowability in polyurethane foam typically used in appliances by as much as 20%. Additionally, surfactants prepared in IPM show increased solubility in some polyols and impart improved storage stability to formulations containing these polyols and surfactants. Other surfactants prepared in IPM or IPP afford water-blown, open celled rigid foams with desirable impact failure or energy absorption. Moreover, these surfactants do not substantially or excessively contribute to window fogging when the foams are used in interior automotive trim. The polyurethanes produced in accordance with the present invention can be used in the same areas as conventional flexible, rigid, froth and automotive interior polyurethanes foams. For example, the foams of the present invention can be used with advantage in the manufacture of cushions, mattresses, padding, carpet underlay, packaging, thermal insulators, automotive interior foam and the like.

The Copolymers and Copolymer/solvent compositions may also be used in personal care applications, shampoo formulations, hand creams, body lotions and hair spray. The compositions are particularly advantageous because they are clear and odorless. Personal care formulations, such as those disclosed in U.S. Pat. No. 4,782,095, are advantageously prepared without the further addition of emollients and emulsifiers. The Copolymers may also be used in radiation cured coatings applications as overprint varnishes.

EXAMPLES

The following examples illustrate embodiments of the present invention, but are not intended to limit the scope of the invention. Examples 1-8 are comparative examples in which known hydrosilation reaction solvents currently used in the preparation of Copolymers were employed. Examples 9-22 below, demonstrate the production of Copolymers in higher boiling point ester solvents free of hydroxy functionality with improved hydrosilation reaction characteristics and reduced product volatility without removal of the reaction solvent from the resulting surfactant product. Whereas Examples 9-12 illustrate hydrosilations with 40-50 weight percent (wt %) contained ester solvents, Examples 13-22 employ lower amounts (~20 wt %).

List of Materials and Abbreviations $M=(CH_3)_3SiO_{1/2}$, $D=(CH_3)_2SiO_{1/2}$, $D'=CH_3SiHO$, $M'=(CH_3)_2SiHO_{1/2}$ 100HA550-OAc=acetoxy capped allyl polyether with 100 wt % ethylene oxide (EO)-608 daltons molecular weight (m.w.)

75HA750-OH=uncapped allyl polyether with 75 wt % EO/25 wt % propylene oxide (PO)-750 daltons m.w.

100HA750-OMe=methyl capped allyl polyether with 100 wt % EO-780 daltons m.w.

75HA750-OMe=methyl capped allyl polyether with 75 wt % EO/25 wt % PO-780 daltons m.w.

75HA1500-OMe=methyl capped allyl polyether with 75 wt % EO/25 wt % PO-1530 daltons m.w.

UA-11 is UCANE Alkylate-11 alkylated benzene from Union Carbide Corporation, SC-100 is Exxon Solvent SC-11 long chain aliphatic solvent, LB-165 is polypropyleneglycol mono-butyl ether, DPG is dipropylene glycol, IPA is isopropyl alcohol, CPA is hexachloroplatinic acid catalyst solution in ethanol, and TMP is 2,2,6,6-Tetramethyl-4-piperidinol.

In addition to the Sill test for reaction completeness, the Copolymer products of Examples 1-22 were evaluated for product clarity, viscosity at 25° C., volatility and performance as surfactants in polyurethane foam formulations.

Example 1 (Comparative)

A well stirred mixture of 108.0 grams of $CH_2$=CHCH$(CH_3)O(CH_2CH_2O)_{34}(CH_2CHCH_3O)_{26}(CH_3)$ CHCH=CH$_2$, 67.0 grams of HMe$_2$SiO(Me$_2$SiO)$_{24}$SiMe$_2$H and 175 grams (50 wt %) of UA-11 solvent was deaerated by nitrogen sparge and heated to 85° C. A solution of $H_2PtCl_6 \cdot 6H_2O$ in ethanol was added to the mixture in sufficient amount to provide 20 ppm Pt. The heat source was removed and the exothermic hydrosilation reaction was allowed to proceed until no further temperature increase was noted. Heat was added to the mixture as needed to keep its temperature at 85° C. for 4 hours. Care was taken never to allow the reaction pot to exceed 100° C. A clear, viscous solution of a Copolymer containing no gel particles and no detectable levels of residual silanic hydrogen was obtained. Its viscosity at 25° C. was 4292 cSt.

Example 2 (Comparative Example)

A well stirred mixture of 155.7 grams of $CH_2$=CHCH$(CH_3)O(CH_2CH_2O)_{41}(CH_2CHCH_3O)_{20}(CH_3)$ CHCH=CH$_2$, 19.3 grams of HMe$_2$SiO(Me$_2$SiO)$_3$SiMe$_2$H and 175 grams (50 wt %) of UA-11 solvent was deaerated by nitrogen sparge and heated to 85° C. A solution of $H_2PtCl_6 \cdot 6H_2O$ in ethanol was added to the mixture in sufficient amount to provide 20 ppm Pt. The heat source was removed and the exothermic hydrosilation reaction was allowed to proceed until no further temperature increase was noted. Heat was added to the mixture as needed to keep its temperature at 85° C. for 3.5 hours. Care was taken never to allow the reaction pot to exceed 100° C. A clear, viscous solution of a Copolymer containing no gel particles and no detectable levels of residual silanic hydrogen was obtained. Its viscosity at 25° C. was 1062 cSt.

Example 3 (Comparative Example)

A well stirred mixture of 116.2 grams of $CH_2$=CHCH$(CH_3)O(CH_2CH_2O)_{41}(CH_2CHCH_3O)_{20}(CH_3)$ CHCH=CH$_2$, 58.8 grams HMe$_2$SiO(Me$_2$SiO)$_{19}$SiMe$_2$H and 175 grams (50 wt %) of Exxon solvent SC-100 was deaerated by nitrogen sparge and heated to 85° C. A solution of $H_2PtCl_6 \cdot 6H_2O$ in ethanol was added to the mixture in sufficient amount to provide 20 ppm Pt. The heat source was removed and the exothermic hydrosilation reaction was allowed to proceed until no further temperature increase was noted. Heat was added to the mixture as needed to keep its temperature at 85° C. for 2.5 hours. Care was taken never to allow the reaction pot to exceed 100° C. A clear solution of a Copolymer containing no gel particles and no detectable levels of residual silanic hydrogen was obtained. Its viscosity at 25° C. was 512 cSt.

Example 4 (Comparative Example)

A well stirred mixture of 123 grams of $CH_2$=CHCH$(CH_3)O(CH_2CH_2O)_{34}(CH_2CHCH_3O)_{26}(CH_3)$ CHCH=$CH_2$, 77.0 gm of $HMe_2SiO(Me_2SiO)_{24}SiMe_2H$, and 200 grams (50 wt %) of $CH_3CH_2CH_2CH_2O$ $(CH_2CHCH_3)_{13}OH$ was deaerated by nitrogen sparge and heated to 85° C. A solution of $H_2PtCl_6 \cdot 6H_2O$ in ethanol was added to the mixture in sufficient amount to provide 20 ppm Pt. The heat source was removed and the exothermic hydrosilation reaction was allowed to proceed until no further temperature increase was noted. Heat was added to the mixture as needed to keep its temperature at 85° C. for 21 hours. The silanic hydrogen content was analyzed to be 2.0 cc $H_2$/gram. The reaction mixture was recatalyzed with 20 ppm of Pt and allowed to react another 9 hours at 85° C. Care was taken never to allow the reaction pot to exceed 100° C. An extremely hazy, solution of a Copolymer with a residual silanic hydrogen content of 2.0 cc $H_2$/ gram and a 25° C. viscosity of 1689 cSt was obtained.

Example 5 (Comparative Example)

A well stirred mixture of 108 grams of $CH_2$=CHCH$(CH_3)O(CH_2CH_2O)_{41}(CH_2CHCH_3O)_{20}(CH_3)$ CHCH=$CH_2$, 67.0 grams of $HMe_2SiO(Me_2SiO)_{24}SiMe_2H$, and 175 grams (50 wt %) of DPG was deaerated by nitrogen sparge and heated to 85° C. A solution of $H_2PtCl_6 \cdot 6H_2O$ in ethanol was added to the mixture in sufficient amount to provide 20 ppm Pt. The heat source was removed and the exothermic hydrosilation reaction was allowed to proceed until no further temperature increase was noted. Heat was added to the mixture as needed to keep its temperature at 85° C. for 26 hours. Care was taken never to allow the reaction pot to exceed 100° C. An extremely hazy, viscous solution of a Copolymer containing a residual silanic hydrogen content of 2.0 cc $H_2$/gm and a 25° C. viscosity of 1741 cSt was obtained.

Example 6 (Comparative Example)

A well stirred mixture of 120 grams of $CH_2$=CHCH$(CH_3)O(CH_2CH_2O)_{34}(CH_2CHCH_3O)_{36}(CH_3)$ CHCH=$CH_2$, 54.8 grams of $HMe_2SiO(Me_2SiO)_{17}SiMe_2H$, 0.175 grams of sodium propionate, and 175 grams (50 wt %) of IPA was deaerated by nitrogen sparge and heated to 80° C. A solution of $H_2PtCl_6 \cdot 6H_2O$ in ethanol was added to the mixture in sufficient amount to provide 20 ppm Pt. The heat source was removed and the exothermic hydrosilation reaction was allowed to proceed until no further temperature increase was noted. Heat was added to the mixture as needed to keep its temperature at 85° C. for 3 hours. Care was taken never to allow the reaction pot to exceed 100° C. A clear, viscous solution of a Copolymer with no residual silanic hydrogen and a 25° C. viscosity of 2051 cSt was obtained.

Example 7 (Comparative Example)

A well stirred mixture of 108 grams of $CH_2$=CHCH$(CH_3)O(CH_2CH_2O)_{41}(CH_2CHCH_3O)_{20}(CH_3)$ CHCH=$CH_2$, 67.0 grams of $HMe_2SiO(Me_2SiO)_{24}SiMe_2H$, and 175 grams (50 wt %) of toluene was deaerated by nitrogen sparge and heated to 85° C. A solution of $H_2PtCl_6 \cdot 6H_2O$ in ethanol was added to the mixture in sufficient amount to provide 20 ppm Pt. The heat source was removed and the exothermic hydrosilation reaction was allowed to proceed until no further temperature increase was noted. Heat was added to the mixture as needed to keep its temperature at 85° C. for 6 hours. Care was taken never to allow the reaction pot to exceed 100° C. A clear, viscous solution of a Copolymer with a residual silanic hydrogen content<0.1 cc $H_2$/gm and a 25° C. viscosity of 2585 cSt was obtained.

Example 8 (Comparative Example)

A well stirred mixture of 155.8 grams of $CH_2$=$CHCH_2O$ $(CH_2CH_2O)_{17.3}(CH_2CHCH_3O)_{19.7}CH_3$, 54.1 grams of $Me_3SiO(Me_2SiO)_{60}(MeHSiO)_7SiMe_3$ and 140 grams (50 wt %) of toluene was deaerated by nitrogen sparge and heated to 85° C. A solution of $H_2PtCl_6 \cdot 6H_2O$ in ethanol was added to the mixture in sufficient amount to provide 20 ppm Pt. The heat source was removed and the exothermic hydrosilation reaction was allowed to proceed until no further temperature increase was noted. Heat was added to the mixture as needed to keep its temperature at 85° C. for 1.5 hours. Care was taken never to allow the reaction pot to exceed 100° C. A clear solution of a Copolymer containing no detectable levels of residual silanic hydrogen and showing a 25° C. viscosity of 97 cSt was obtained.

Example 9

A well stirred mixture of 108 grams of $CH_2$=CHCH$(CH_3)O(CH_2CH_2O)_{34}(CH_2CHCH_3O)_{26}(CH_3)$ CHCH=$CH_2$, 67 grams of $HMe_2SiO(Me_2SiO)_{24}SiMe_2H$, and 175 grams (50 wt %) of IPP was deaerated by nitrogen sparge and heated to 85° C. A solution of $H_2PtCl_6 \cdot 6H_2O$ in ethanol was added to the mixture in sufficient amount to provide 20 ppm Pt. The heat source was removed and the exothermic hydrosilation reaction was allowed to proceed until no further temperature increase was noted. Heat was added to the mixture as needed to keep its temperature at 85° C. for 1.5 hours. Care was taken never to allow the reaction pot to exceed 100° C. A clear, viscous solution of a Copolymer containing no detectable levels of residual silanic hydrogen and possessing a 25° C. viscosity of 6366 cSt was obtained.

Example 10

A well stirred mixture of 108 grams of $CH_2$=CHCH$(CH_3)O(CH_2CH_2O)_{41}(CH_2CHCH_3O)_{20}(CH_3)$ CHCH=$CH_2$, 67.0 grams of $HMe_2SiO(Me_2SiO)_{19}SiMe_2H$, and 175 grams (50 wt %) of IPM was deaerated by nitrogen sparge and heated to 85° C. A solution of $H_2PtCl_6 \cdot 6H_2O$ in ethanol was added to the mixture in sufficient amount to provide 20 ppm Pt. The heat source was removed and the exothermic hydrosilation reaction was allowed to proceed until no further temperature increase was noted. Heat was added to the mixture as needed to keep its temperature at 85° C. for 1.25 hours. Care was taken never to allow the reaction pot to exceed 100° C. A clear, viscous solution of a Copolymer containing no detectable levels of residual silanic hydrogen and possessing a viscosity of 3943 cSt at 25° C. was obtained.

Example 11

A well stirred mixture of 108 grams of $CH_2$=CHCH$(CH_3)O(CH_2CH_{20})_{41}(CH_2CHCH_3O)_{20}(CH_3)CHCH$=$CH_2$, 67.0 grams of $HMe_2SiO(Me_2SiO)_{24}SiMe_2H$, and 175 grams (50 wt %) of BYM was deaerated by nitrogen sparge and heated to 85° C. A solution of $H_2PtCl_6 \cdot 6H_2O$ in ethanol was added to the mixture in sufficient amount to provide 20 ppm Pt. The heat source was removed and the exothermic hydrosilation reaction was allowed to proceed until no further temperature increase was noted. Heat was added to the mixture as needed to keep its temperature at 85° C. for 3 hours. Care was taken never to allow the reaction pot to exceed 100° C. A clear, viscous solution of a Copolymer containing no detectable levels of residual silanic hydrogen and possessing a viscosity of 1646 cSt at 25° C. was obtained.

EXAMPLE 12

A well stirred mixture of 103.9 grams of $CH_2$=$CHCH_2O(CH_2CH_2O)_{17.3}(CH_2CHCH_3O)_{19.7}CH_3$, 36.1 grams of $Me_3SiO(Me_2SiO)_{60}(MeHSiO)_7SiMe_3$ and 93.3 grams (40 wt %) of IPP was deaerated by nitrogen sparge and heated to 85° C. A solution of $H_2PtCl_6 \cdot 6H_2O$ in ethanol was added to the mixture in sufficient amount to provide 20 ppm Pt. The heat source was removed and the exothermic hydrosilation reaction was allowed to proceed until no further temperature increase was noted. Heat was added to the mixture as needed to keep its temperature at 85° C. for 2 hours. Care was taken never to allow the reaction pot to exceed 100° C. A clear, viscous solution of a Copolymer containing no detectable levels of residual silanic hydrogen and possessing a viscosity of 199 cSt at 25° C. was obtained.

Example 13–22

Examples 13–22 illustrate the synthesis of copolymers in ~20 wt % IPM, IPP or polypropylene glycol dibenzoate (BENZOFLEX® 400, sold commercially by Velsicol Chemical Corporation) according to the hydrosilation procedures described above. The quantities of raw materials used are set forth in the following tables. All of the hydrosilations were completed with a single catalyst addition.

| RAW MATERIALS | EX. 13 | EX. 14 | EX. 15 | EX. 16 | EX. 17 |
|---|---|---|---|---|---|
| $MD_{32}D'_{9.6}M$, gm | 35.7 | | | | |
| $MD_{43.2}D'_{6.8}M$, gm | | 51.1 | 32.2 | | |
| $MD_{41}D'_9M$, gm | | | | 50.0 | |
| $M'D_{60}D'_{10}M'$, gm | | | | | 50.0 |
| 75HA750-OMe, gm | 143.9 | | | | |
| 75HA750-OH, gm | | 110.9 | | | 111.2 |
| 75HA1500-OMe, gm | | | 121.0 | | |
| 75HA1500-OAc, gm | | | | 92.6 | |
| IPM, gm | 43.0 | 43.0 | 43.0 | 43.0 | 43.0 |
| TMP, gm | | 0.11 | | | 0.11 |
| CPA, ml | 0.5 | 0.5 | 0.5 | 0.5 | 0.5 |
| EXOTHERM, | | | | | |
| °C. | 23 | 21 | 5 | 6 | 13.5 |
| min | 2.7 | 1.5 | 2.0 | 1.5 | 2.0 |
| VISCOSITY, cSt, at 25° C. | 164 | 260 | 337 | 212.5 | 273.8 |

| RAW MATERIALS | EX. 18 | EX. 19 | EX. 20 | EX. 21 | EX. 22 |
|---|---|---|---|---|---|
| $MD_{32}D'_{9.6}M$, gm | 35.8 | | | | |
| $MD_{43.2}D'_{6.8}M$, gm | | 51.0 | 32.2 | | |
| $MD_{41}D'_9M$, gm | | | | 50.0 | |
| $M'D_{60}D'_{10}M'$, gm | | | | | 50.0 |
| 75HA750-OMe, gm | 137.5 | | | | |
| 75HA750-OH, gm | | 114.8 | | | 111.2 |
| 75HA1500-OMe, gm | | | 140.0 | | |
| 100HA550-OAc, gm | | | | 92.6 | |
| IPP, gm | 43.0 | 43.0 | 43.0 | | |
| Benzoflex® 400, gm | | | | 43.0 | 48.0 |
| TMP, gm | | 0.11 | | | 0.12 |
| CPA, ml | 0.5 | 0.5 | 0.5 | 0.5 | 0.5 |
| EXOTHERM, | | | | | |
| °C. | 22 | 10 | 6 | 4 | 12 |
| min | 2.7 | 2.0 | 1.6 | 2.5 | 1.5 |
| VISCOSITY, cSt, at 25° C. | 175.5 | 293 | 387.5 | 512.5 | 940 |

The data show that all the hydrosilations proceeded to completion with observable exotherms. The Copolymers had viscosities, pour points and surface activities which made them suitable as surfactants for rigid polyurethane and polyisocyanurate foams. In particular, the Copolymer of Example 14 showed 20% improved flowability over the solventless product in a water-blown rigid foam formulation. The Copolymer of Example 15 was soluble in polyols used for HCFC-141b appliance foams, whereas the solventless product was not. Thus, it afforded storage stable polyol premixes which yielded foams with acceptable processing and properties.

Volatility Test

Volatility of the reaction product was determined by the following method (ASTM D 4559–92): (A) Preweigh a 2 inch alumina dish to the nearest 0.1 mg. (B) Add approximately 1 gram of sample weighted to the nearest 0.1 mg. (C) Repeat steps A and B for duplicate determination. (D) Heat for one hour at 110° C. at atmospheric pressure in a forced draft oven set at 110° C. (E) Cool in the sample in air for 10 minutes and reweigh. The volatility is calculated utilizing the following equation:

$$\text{Wt \% Solids} = 100 - [(B-A) * 100/B]$$

where A=weight of sample after heating and B=Weight of sample before heating. The volatility is reported as the average of the two results to the nearest 0.1%.

| | Foam Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| % Solids | 72.2 | 67.2 | 50.5 | 99.6 | 48.3 | 51.5 | 64.7 | 67.4 | 94.2 | 86.0 | 94.0 | 96.0 |

The data indicate that the higher boiling point ester solvents (Examples 9–12) provide for a facile hydrosilation reaction while affording clear, homogeneous Copolymers with minimal volatility.

Foam Test

The Copolymer products of Examples 1–12 were evaluated in the following waterblown, open-celled foam formulation. A mixture of 100 parts of a base, 1.00 parts of the above surfactant (not counting the solvent) and 0.2 pans of NIAX A-400 catalyst, 0.9 parts of NIAX A-305 catalyst, and 1.0 parts water, was thoroughly mixed. To the above mixture was added 264 parts polymeric MDI (methylenediphenylene diisocyanate) and the resulting mixture was mixed on a high speed mixer for 5 seconds and poured into a one gallon paper bucket. The mixture was allowed to foam and rise to maximum height and was cured at room temperature for 3 minutes.

The cured foam was evaluated by measuring foam cell structure and uniformity.

| Foam Example | Solvent Amount | Solvent Type | Reaction Time Hr. | Clarity HACH | Foam Cell Uniformity[1] | Molecular Weight[2] | Viscosity cSt.[3] |
|---|---|---|---|---|---|---|---|
| 1 | 50% | UA-11 | 3.5 | 1.28 | 2.8 | 39100 | 4292 |
| 2 | 50% | UA-11 | 3.5 | .56 | 2.2 | 22500 | 1062 |
| 3 | 50% | SC-100 | 2.5 | 5.0 | 1.8 | 27200 | 512 |
| 4 | 50% | LB-165 | 30.0 | >200 | 10 | ND | 1689 |
| 5 | 50% | DPG | 26.0 | >200 | 9.8 | ND | 1741 |
| 6 | 50% | IPA | 3.0 | .43 | 1.7 | 36000 | 2051 |
| 7 | 50% | Toluene | 6.0 | 2.6 | 6.1 | 45000 | 2585 |
| 8 | 40% | Toluene | 1.5 | 3.6 | 2.0 | 21000 | 97 |
| 9 | 50% | IPP | 1.5 | .38 | 1.3 | 37000 | 6366 |
| 10 | 50% | IPM | 1.25 | 1.17 | 1.2 | 36000 | 3943 |
| 11 | 50% | BYM | 3.0 | 4.9 | 4.3 | 29000 | 1646 |
| 12 | 40% | IPP | 2.0 | 4.0 | 2.0 | 20000 | 199 |

[1]Foam Cell Uniformity is judged by the structure of the foam where a 1 has small uniform cell structure and a 10 has large non-uniform course cell structure. Foams were evaluated in triplicate and values averaged.
[2]Peak Average Molecular Weight as measured on a Waters GPC, Flow Rate 1 mL/min, tetrahydrofuran solvent on Styragel Columns.
[3]Cannon-Fenske at 25° C.

The data indicate that the higher boiling point ester solvents (Examples 9–12) provide for a facile hydrosilation reaction while affording clear, homogeneous Copolymer, which provide excellent cell structure uniformity and high open cell content in rigid foam.

We claim:

1. A process for making a polysiloxane polyether copolymer comprising reacting (a) organohydrogensiloxane;

(b) unsaturated polyoxyalkylene polyethers; and (c) an ester solvent without hydroxyl moieties;

in the presence of a noble metal hydrosilation catalyst in an inert atmosphere and a temperature which does not exceed the temperature at which the organohydrogensiloxane reacts with the solvent.

2. A process according to claim 1 wherein the esters have a boiling point of greater than 170° C.

3. A process according to claim 1 wherein the silane is of the formula $R_aH_bSiO_{(4-a-b)/2}$.

4. A process according to claim 1 wherein the polyethers are of the formula $$R^1(OCH_2CH_2)_z(OCH_2CHR^3)_w\text{—}OR^2, \text{ or}$$

$$R_2O(CH[R^3]CH_2O)_w(CH_2CH_2O)_z\text{—}CR^4_2\text{—}C\equiv C\text{—}CR^4_2\text{—}(OCH_2CH_2)_z(OCH_2[R^3]CH)_wR^2$$

wherein $R^1$ denotes an unsaturated organic group containing from 3 to 10 carbon atoms, $R^2$ is selected from the group consisting of hydrogen, alkyl groups containing one to eight carbon atoms, alkylene groups containing from 3 to 10 carbon atoms, acyl groups containing 2 to 8 carbon atoms or a trialkylsilyl group, $R^3$ and $R^4$ are monovalent hydrocarbon groups, $R^4$ may also be hydrogen, Z has a value of 0 to 100 and w has a value of 0 to 120.

5. A process according to claim 1 where the esters are of the formula $$R^5(COOR^6)_n, \text{ or}$$

$$R^5COO(CH_2CH_2O)_a(CH[R^3]CH_2O)_bOCR^5$$

in which $R^3$ is a monovalent hydrocarbon group, a and b are 0 to 120, $R^5$ is a straight or branched alkyl, aryl, alkaryl or cycloaliphatic group of valency equal to the number, n, $R^6$ is a monovalent hydrocarbon radical derived from an alcohol and the total number of carbon atoms in $R^5$ and $R^6$ should be at least eight.

6. A process according to claim 1 wherein the reaction is conducted in the presence of additive selected from the group consisting of: carboxylic acids salts, sterically hindered nitrogen compounds or the phosphate salts.

7. A composition for making a polysiloxane polyether copolymer comprising:

(a) organohydrogensiloxane;

(b) polyoxyalkylene polyethers; and (c) an ester solvent without hydroxyl moieties.

8. The composition according to claim 7 wherein the siloxane is of the formula $R_aH_bSiO_{(4-a-b)/2}$.

9. The composition according to claim 7 wherein the polyethers are of the formula $$R^1(OCH_2CH_2)_z(OCH_2CHR^3)_w\text{—}OR^2, \text{ or}$$

$$R^2O(CH[R^3]CH_2O)_w(CH_2CH_2O)_z\text{—}CR^4_2\text{—}C\equiv C\text{—}CR^4_2\text{—}(OCH_2CH_2)_z(OCH_2[R^3]CH)_wR^2$$

wherein $R^1$ denotes an unsaturated organic group containing from 3 to 10 carbon atoms, $R^2$ is selected from the group consisting of hydrogen, alkyl groups containing one to eight carbon atoms, alkylene groups containing from 3 to 10 carbon atoms, acyl groups containing 2 to 8 carbon atoms or a trialkylsilyl group, $R^3$ and $R^4$ are monovalent hydrocarbon groups, $R^4$ may also be hydrogen, Z has a value of 0 to 100 and w has a value of 0 to 120.

10. The composition according to claim 7 wherein the esters are of the formula $$R^5(COOR^6)_n \text{ or}$$

$$R^5COO(CH_2CH_2O)_a(CH[R^3]CH_2O)_bOCR^5$$

in which $R^3$ is a monovalent hydrocarbon group, a and b are 0 to 120, $R^5$ is a straight or branched alkyl, aryl, alkaryl or cycloaliphatic group of valency equal to the number, n, $R^6$ is a monovalent hydrocarbon radical derived from an alcohol and the total number of carbon atoms in $R^5$ and $R^6$ should be at least eight.

11. A polysiloxane polyether copolymer composition comprising:

(a) a polyoxyalkylene polysiloxane copolymer; and (b) an ester solvent without hydroxyl moieties.

12. A composition according to claim 11 wherein the polysiloxane polyether copolymer has a structure selected from the group consisting of: linear, T, Q and $[AB]_n$.

13. A composition according to claim 11 wherein the esters are of the formula $$R^5(COOR^6)_n \text{ or}$$

$$R^5COO(CH_2CH_2O)_a(CH[R^3]CH_2O)_bOCR^5$$

in which $R^3$ is a monovalent hydrocarbon group, a and b are 0 to 120, $R^5$ is a straight or branched alkyl, aryl, alkaryl or cycloaliphatic group of valency equal to the number, n, $R^6$ is a monovalent hydrocarbon radical derived from an alcohol and the total number of carbon atoms in $R^5$ and $R^6$ should be at least eight.

14. A composition according to claim 11 wherein the ester is a naturally occurring ester without a hydroxyl group.

15. A composition according to claim 11 wherein the ester is derived from a naturally occuring fatty acid or fatty alcohol, or a mixture thereof.

* * * * *